(12) United States Patent
Contreras et al.

(10) Patent No.: US 8,982,504 B1
(45) Date of Patent: Mar. 17, 2015

(54) IMPLEMENTING CALIBRATION OF COOLING SENSITIVITY OF EMBEDDED CONTACT SENSOR (ECS) SIGNAL USING THERMAL FLY-HEIGHT CONTROL (TFC) ACTUATIONS

(71) Applicant: HGST Netherlands B.V., Amsterdam (NL)

(72) Inventors: John Contreras, Palo Alto, CA (US); Saurabh Deoras, Milpitas, CA (US); Samir Garzon, San Jose, CA (US); Remmelt Pit, Palo Alto, CA (US); Craig K. Yanagisawa, Palo Alto, CA (US)

(73) Assignee: HGST Netherlands BV, Amsterdam (NL)

( * ) Notice: Subject to any disclaimer, the term of this patent is extended or adjusted under 35 U.S.C. 154(b) by 0 days.

(21) Appl. No.: 14/102,458

(22) Filed: Dec. 10, 2013

(51) Int. Cl.
G11B 21/02 (2006.01)

(52) U.S. Cl.
USPC ............................................. 360/75

(58) Field of Classification Search
None
See application file for complete search history.

(56) References Cited

U.S. PATENT DOCUMENTS

| | | |
|---|---|---|
| 7,800,858 B1 | 9/2010 | Bajikar et al. |
| 7,982,987 B2 | 7/2011 | Deng et al. |
| 8,335,053 B2 | 12/2012 | Chen et al. |
| 8,482,872 B1 * | 7/2013 | Contreras et al. ............ 360/31 |
| 8,599,506 B2 * | 12/2013 | Contreras et al. ............ 360/31 |
| 8,711,508 B2 * | 4/2014 | Kurita et al. ................ 360/55 |
| 2009/0262458 A1 | 10/2009 | Shen et al. |
| 2011/0157736 A1 | 6/2011 | Contreras et al. |
| 2012/0099218 A1 | 4/2012 | Kurita et al. |
| 2012/0120521 A1 | 5/2012 | Kurita et al. |
| 2013/0044387 A1 | 2/2013 | Marchon et al. |

* cited by examiner

Primary Examiner — K. Wong
(74) Attorney, Agent, or Firm — Joan Pennington (57) ABSTRACT

A method, apparatus, and system for implementing calibration of cooling sensitivity of embedded contact sensor (ECS) using thermal fly-height control (TFC) actuations, by subtracting the linear part (TFC heat) from the total measured ECS signal, a profile is provided that is sensitive only to the clearance of the head-disk interface due to cooling effect for hard disk drives.

20 Claims, 11 Drawing Sheets

IMPLEMENTING CALIBRATION OF COOLING SENSITIVITY OF EMBEDDED CONTACT SENSOR (ECS) SIGNAL USING THERMAL FLY-HEIGHT CONTROL (TFC) ACTUATIONS

FIELD OF THE INVENTION

The present invention relates generally to the data storage field, and more particularly, relates to a method, apparatus, and system for implementing calibration of cooling sensitivity of embedded contact sensor (ECS) signal using thermal fly-height control (TFC) actuations for hard disk drives.

DESCRIPTION OF THE RELATED ART

Many data processing applications require long-term data storage and typically a high-degree of data integrity. Typically these needs are met by non-volatile data storage devices. Non-volatile storage or persistent media can be provided by a variety of devices, most commonly, by direct access storage devices (DASDs), which also are referred to as hard disk drives (HDDs).

In hard disk drives (HDDs) or a disk-drive system, read and write transducers reside in a slider which flies over a recording media or disk surface. Reduced magnetic spacing between the disk media and the head continues to be highly important to accommodate increased media areal densities in magnetic recording. The fly-height of the slider-to-disk has become smaller as storage densities continue to increase and fly-heights decrease.

Over the years reducing head-disk clearance in hard-disk drives has been perhaps the most important factor for areal density growth. Since nominal clearance values are about to go below 1 nm, it is becoming increasingly imperative to address the variation in spacing around the revolution, which is now a significant part of the nominal clearance. Among various signals that are employed to measure such variation in clearance, ECS signal exhibits the best signal clarity, ease of use, availability and provides significant advances in test times. To make use of ECS signal, however, requires that it be calibrated against spacing.

A need exists for effective mechanism for implementing calibration of the embedded contact sensor (ECS) signal. It is desirable to provide such mechanism to allow for efficient and effective calibration operation.

SUMMARY OF THE INVENTION

Aspects of the preferred embodiments are to provide a method, apparatus, and system for implementing calibration of cooling sensitivity of embedded contact sensor (ECS) signal using thermal fly-height control (TFC) actuations for hard disk drives. Other important aspects of the preferred embodiments are to provide such method, apparatus, and system substantially without negative effect and to overcome some of the disadvantages of prior art arrangements.

In brief, a method, apparatus, and system for implementing calibration of cooling sensitivity of embedded contact sensor (ECS) signal using thermal fly-height control (TFC) actuations, by subtracting a linear part (TFC heat) from the total measured ECS signal, a profile is provided that is sensitive only to the clearance of the head-disk interface due to cooling effect for hard disk drives.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

In the following detailed description of embodiments of the invention, reference is made to the accompanying drawings, which illustrate example embodiments by which the invention may be practiced. It is to be understood that other embodiments may be utilized and structural changes may be made without departing from the scope of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In accordance with features of the preferred embodiments, a method, apparatus, and system for implementing calibration of cooling sensitivity of embedded contact sensor (ECS) signal using thermal fly-height control (TFC) actuations for hard disk drives.

Figure 1A:
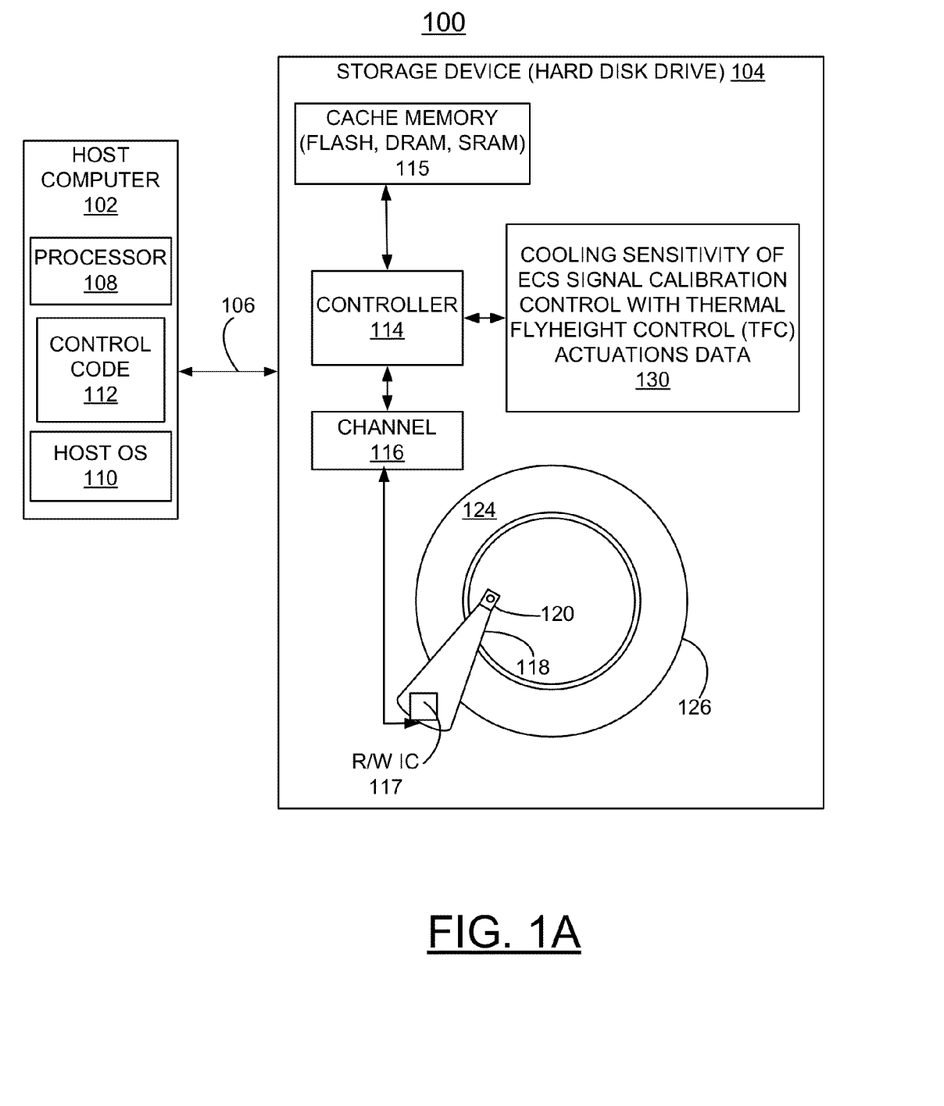
FIGS. 1A and 1B together provide a block diagram representation illustrating a system for implementing calibration of cooling sensitivity of embedded contact sensor (ECS) signal using thermal fly-height control (TFC) actuations in accordance with preferred embodiments.
Figure 1B:
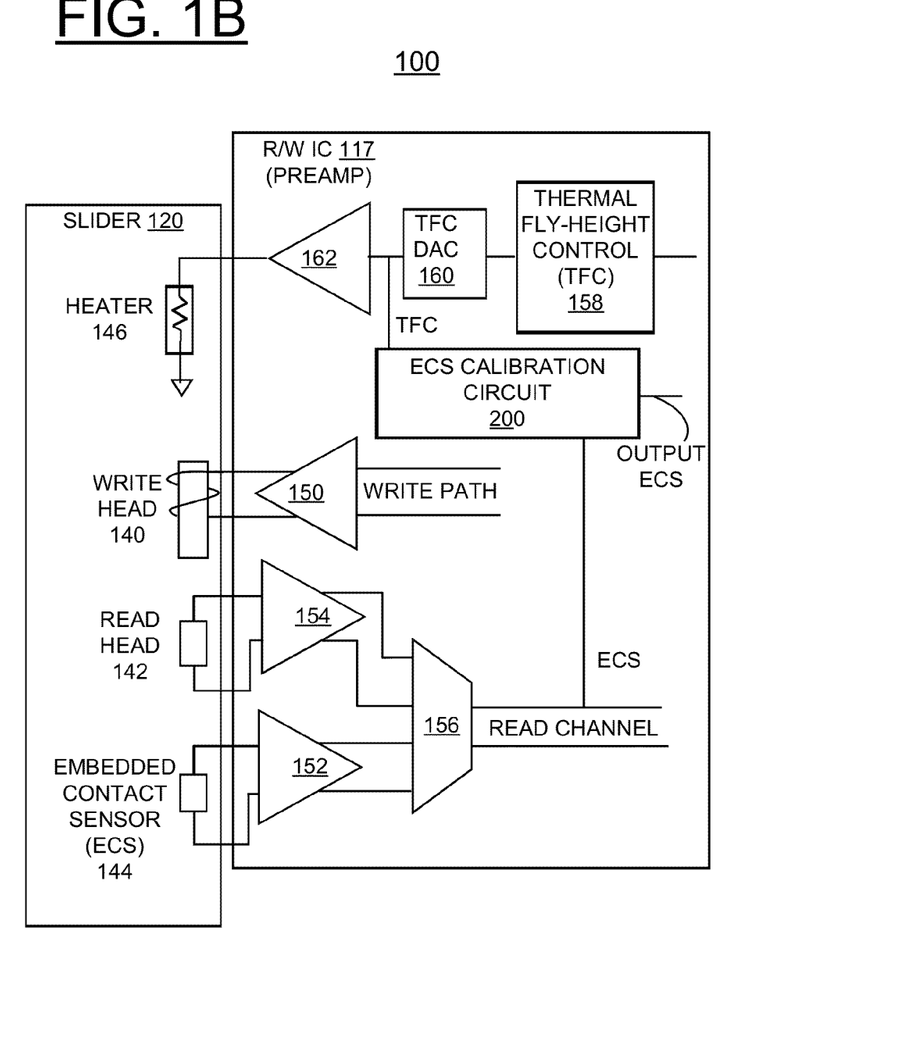

Having reference now to the drawings, in FIGS. 1A and 1B, there is shown an example system generally designated by the reference character 100 for implementing calibration of cooling sensitivity of embedded contact sensor (ECS) signal using thermal fly-height control (TFC) actuations for hard disk drives in accordance with preferred embodiments. System 100 includes a host computer 102, a storage device 104, such as a hard disk drive (HDD) 104, and an interface 106 between the host computer 102 and the storage device 104.

As shown in FIG. 1A, host computer 102 includes a processor 108, a host operating system 110, and control code 112. The storage device or hard disk drive 104 includes a controller 114 coupled to a cache memory 115, for example, implemented with one or a combination of a flash memory, a dynamic random access memory (DRAM) and a static random access memory (SRAM), and coupled to a data channel 116. The storage device or hard disk drive 104 includes a Read/Write (R/W) integrated circuit (IC) 117 implementing the calibration of cooling sensitivity of embedded contact sensor (ECS) signal using thermal fly-height control (TFC) actuations. The storage device or hard disk drive 104 includes an arm 118 carrying a slider 120 for in accordance with preferred embodiments. The slider 120 flies over a writable disk surface 124 of a disk 126 and includes a heater element coupled to a thermal fly-height control (TFC) to compensate for dynamic flying height change around the revolution.

In accordance with features of preferred embodiments, calibration of cooling sensitivity of embedded contact sensor (ECS) signal is provided using thermal fly-height control (TFC) actuations data 130 applied to the controller 114. ECS self calibration is performed over a range of TFC and bias values, with sensitivity increases with higher bias and lower clearance.

As shown in FIG. 1B, the slider 120 contains a write head 140, a read head 142, an embedded contact sensor (ECS) 144, and a heater element 146. The R/W integrated circuit (IC) 117 or preamplifier (preamp) includes an amplifier 112 in a write path applying an amplified write signal to the write head 140, an amplifier 152 coupled to the ECS 144 and an amplifier 154 coupled to the read head 142, and a multiplexer 156 in a read path. The amplified ECS signal output of amplifier 152 and the amplified read signal output of amplifier 164 are applied to a respective input of the multiplexer 156. R/W integrated circuit (IC) 117 includes a thermal fly-height control (TFC) 158 coupled via a TFC digital-to-analog converter (DAC) 160, and an amplifier 162 to the heater element 146. R/W integrated circuit (IC) 117 includes an embedded contact sensor (ECS) calibration circuit 200 in accordance with preferred embodiments, for example, as illustrated and described with respect to FIG. 2. The thermal fly-height control (TFC) 158 receives an output embedded contact sensor (ECS) signal information of ECS calibration circuit 200 that is calibrated in accordance with preferred embodiments.

System 100 including the host computer 102 and the hard disk drive or HDD 104 is shown in simplified form sufficient for understanding the present invention. The illustrated host computer 102 together with the storage device or HDD 104 is not intended to imply architectural or functional limitations. The present invention can be used with various hardware implementations and systems and various other internal hardware devices.

In accordance with features of preferred embodiments, calibration of cooling sensitivity of embedded contact sensor (ECS) signal is implemented using thermal fly-height control (TFC) actuations for hard disk drives. ECS signal exhibits the best signal clarity, ease of use, and availability to address the variation in fly-height or variation in clearance spacing around the revolution. To make use of ECS signal, required calibration of the ECS signal against spacing is provided in accordance with preferred embodiments.

Figure 2:
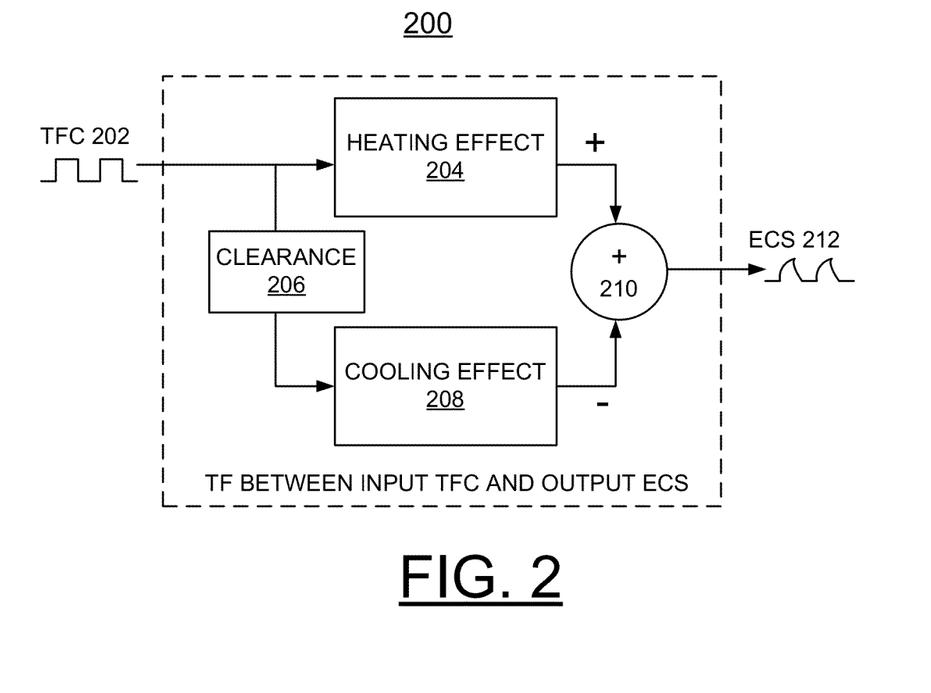
FIG. 2 schematically illustrates not to scale an example circuit for implementing calibration of cooling sensitivity of embedded contact sensor (ECS) signal using thermal fly-height control (TFC) actuations for hard disk drives (HDDs) in accordance with preferred embodiments.

Referring now FIG. 2, there is shown schematically an example circuit generally designated by the reference character 200 for implementing calibration of cooling sensitivity of embedded contact sensor (ECS) signal using thermal fly-height control (TFC) actuations for hard disk drives (HDDs) in accordance with preferred embodiments. Calibration circuit 200 implements the calibration of cooling sensitivity of embedded contact sensor (ECS) signal in accordance with preferred embodiments and is located, for example, in the Read/Write (R/W) integrated circuit (IC) 117 or preamplifier 117.

In accordance with features of preferred embodiments, embedded contact sensor (ECS) signal is calibrated in accordance with preferred embodiments, is modeled as superposition of heating and cooling effects. Heating effects are due to thermal fly-height control (TFC), which is linear with respect to TFC power. Cooling effects, due to disk proximity, are non-linear typically to the fourth ($4^{th}$) order of clearance. Calibrating the ECS signal requires calculating sensitivity to cooling, where cooling sensitivity that is not offset is negligible far away relative to sensitivity as the TFC operating point.

In accordance with features of preferred embodiments, a number of TFC DACs needed to compensate of 1 DAC of ECS DCR are shown in Table 1 below. The lower the number of TFC DACs needed, the higher is the sensitivity to cooling.

TABLE 1

Calibration Data (Operating TFC)

| | | | | High Bias | | | | | |
|---|---|---|---|---|---|---|---|---|---|
| OD to ID | −10 | −9 | −9 | −11 | −10 | −10 | −9 | −09 | −8 | −8 |

| | | | | Mid Bias | | | | | |
|---|---|---|---|---|---|---|---|---|---|
| OD to ID | −12 | −13 | −14 | −11 | −14 | −10 | −10 | −11 | −11 | −11 |

| | | | | Low Bias | | | | | |
|---|---|---|---|---|---|---|---|---|---|
| OD to ID | −14 | −13 | −14 | −13 | −13 | −12 | −10 | −12 | −10 | −12 |

As expected sensitivity to cooling goes down with reducing bias. Typical flying height modulation around the revolution, assuming these sensitivity values, are on the order of 3-5A, PKPK (peak-to-peak).

In accordance with features of preferred embodiments, the ECS signal advantageously is self calibrated for use in thermal fly-height control (TFC) where two key assumptions are made. First that the ECS response is linear to the first order to TFC power; and second that ECS response to cooling far away from operating TFC is negligible. The ECS calibration procedure involves computing a ECS DCR slope to TFC at two different TFC points, at operating TFC and at far away from operating TFC, such as 20 DACs from the operating TFC. Note that measurement may not be reliable far away from the operating point; low flying/high sensitive heads may be prone to underestimation and overcompensation; and limits or caps on TFC/ECS sensitivity are recommended at abs (TFC/ECS)<20 for the case of 100 mOhm ECS DCR ADC resolution preamps and typical CBS interfaces.

Calibration circuit 200 includes an input TCF signal 202 applied to a heating effect function 204 and a clearance function 206, which provides an input to a cooling effect function 208. The respective outputs of the heating effect function 204 and of the cooling effect function 208 are applied to a summation block or adder 210, which provides an output calibrated ECS signal 212. At heating effect function 204, ECS DCR slope to TFC is calculated at two different TFC points including at an operating TFC and at a far away form the operating TFC, such as 20 DACs, and an effect of cooling is identified at cooling effect function 208, for example as illustrated and described with respect FIG. 3, and FIGS. 4A, 4B, 4C, and 4D.

Figure 3:
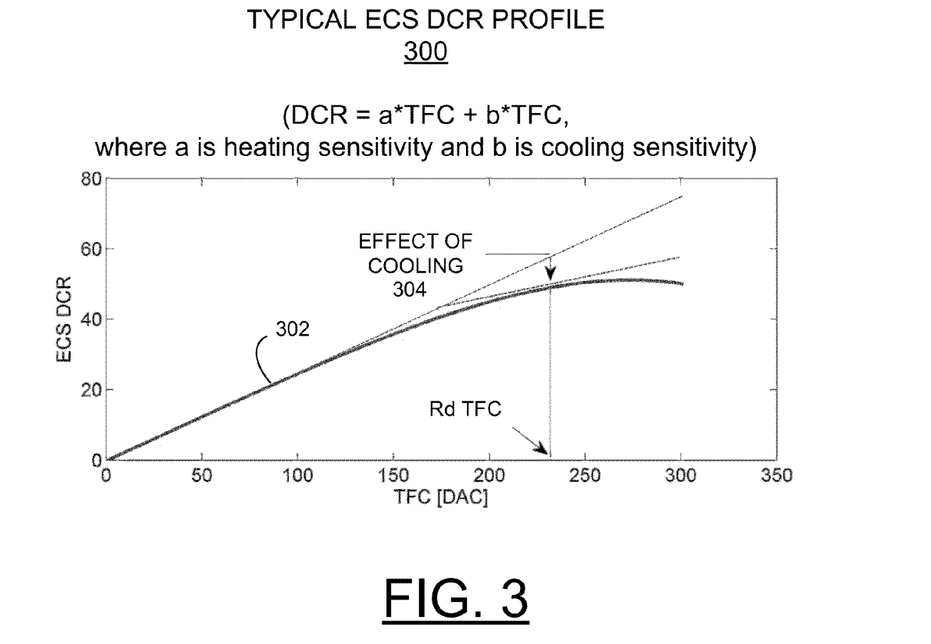
FIG. 3 is a chart illustrating an example typical embedded contact sensor (ECS) signal profile with respect to thermal fly-height control (TFC) actuations in accordance with preferred embodiments.

Referring also to FIG. 3 there is shown an example typical embedded contact sensor (ECS) signal profile generally designated by the reference character 300 with ECS DCR shown relative to a vertical axis and thermal fly-height control (TFC) DAC shown relative to a horizontal axis in accordance with preferred embodiments. Calibrating the ECS signal requires calculating sensitivity to cooling, where cooling sensitivity that is not offset is negligible far away relative to sensitivity as the TFC operating point. As indicated in a line 302, an ECS DCR slope to TFC is shown with an operating TFC (Rd TFC) of about 240 TFC (DAC) and an effect of cooling 304 also is shown. For example, the calibrated ECS signal is able to capture the flying height modulation of the head. In order to calibrate the ECS signal to spacing, the fact that the ECS signal is a superposition of heating and cooling effect is used as illustrated in FIG. 3.

FIGS. 4A, 4B, 4C, and 4D are respective charts illustrating example input thermal fly-height control (TFC) actuations; example output embedded contact sensor (ECS) signal, example input to output thermal fly-height; and example sensitivity histograms relative to embedded contact sensor (ECS) signal in accordance with preferred embodiments.

Figure 4A:
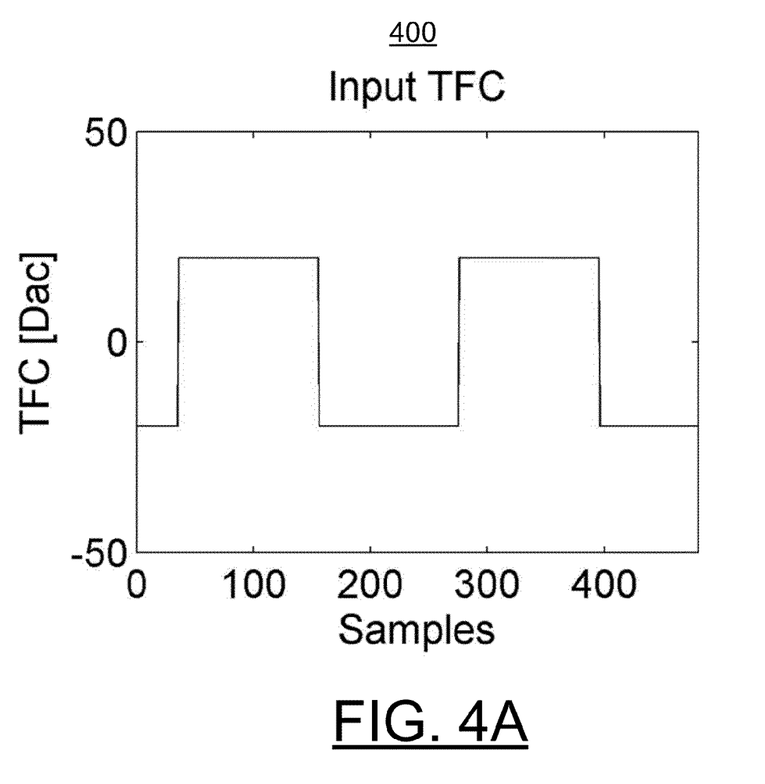
FIGS. 4A, 4B, 4C, and 4D are respective charts illustrating example input thermal fly-height control (TFC) actuations; example output embedded contact sensor (ECS) signal, example input to output thermal fly-height; and example sensitivity histograms relative to embedded contact sensor (ECS) signal in accordance with preferred embodiments.

In FIG. 4A, there is shown an example input thermal fly-height control (TFC) actuations or TFC DAC generally designated by the reference character 400 with ECS DCR shown relative to a vertical axis and samples shown relative to a horizontal axis.

Figure 4B:
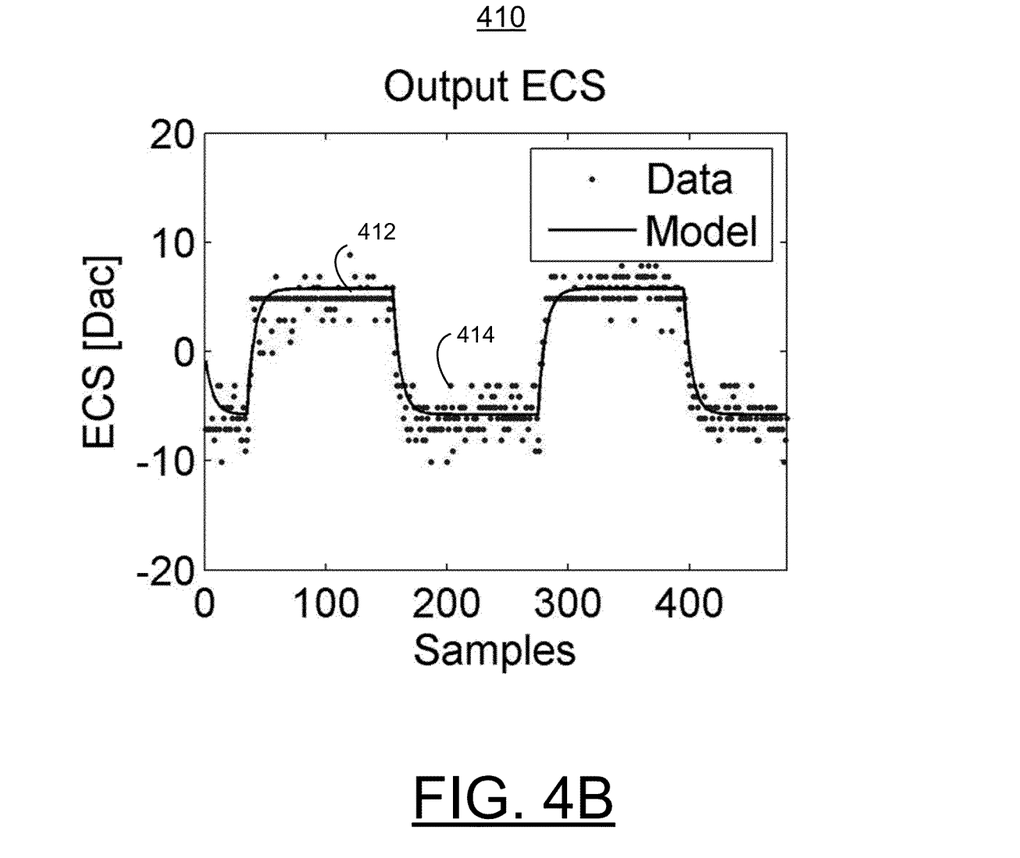

In FIG. 4B, there is shown an example output embedded contact sensor (ECS) signal generally designated by the reference character 410 with ECS DCR shown relative to a vertical axis and samples shown relative to a horizontal axis. The illustrated output embedded contact sensor (ECS) signal 410 includes a model output ECS indicated by a line 412, and data indicated by dots.

Figure 4C:
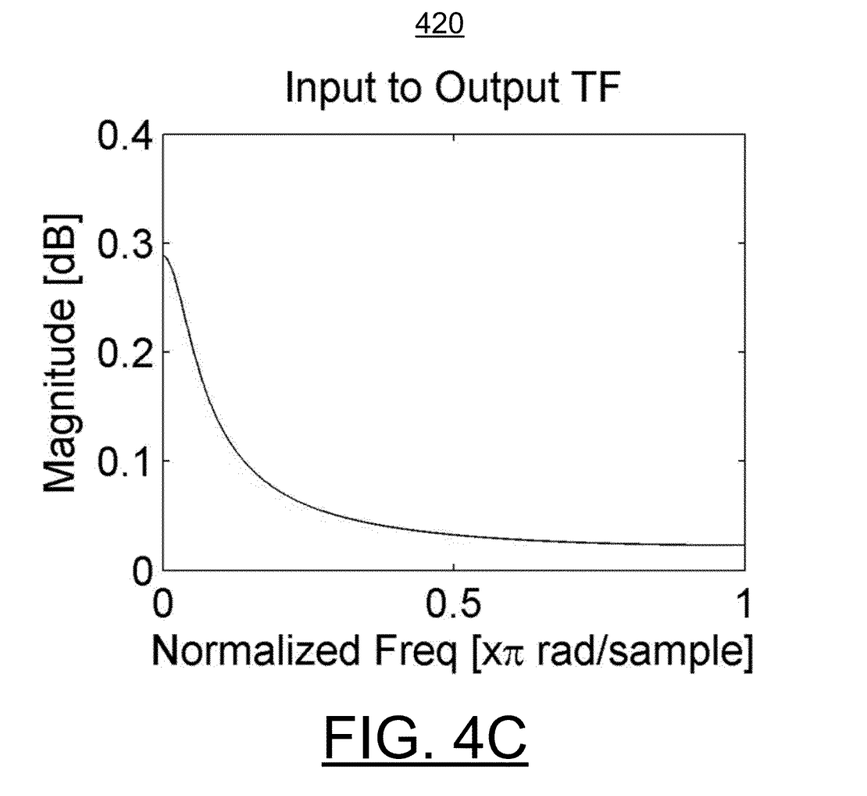

In FIG. 4C, there is shown example input to output thermal fly-height generally designated by the reference character 420 with magnitude (did) shown relative to a vertical axis and normalized frequency (X$\pi$ rad/sample) shown relative to a horizontal axis.

Figure 4D:
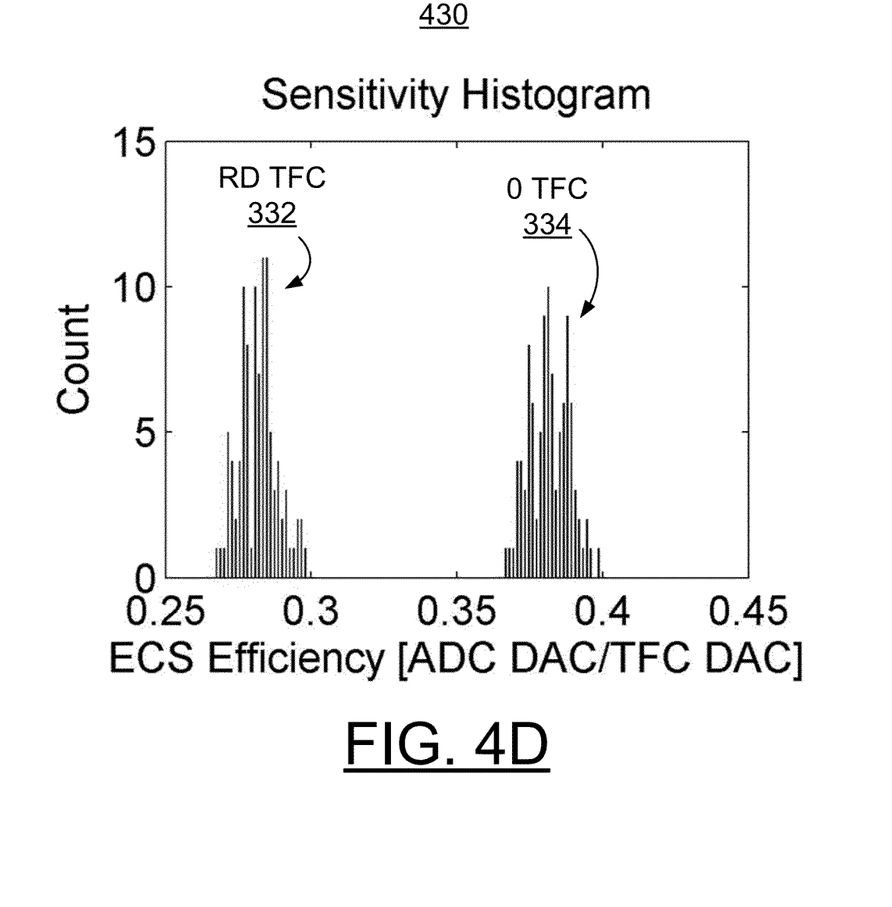

In FIG. 4D, there is shown example sensitivity histograms relative to generally designated by the reference character 430 with count shown relative to a vertical axis and embedded contact sensor (ECS) signal efficiency shown relative to a horizontal axis. The example sensitivity histograms 430 include a sensitivity histogram 432 at the operating TFC (Rd TFC), such as illustrated in FIG. 3. The example sensitivity histograms 430 include a sensitivity histogram 434 at the operating TFC, near 20 TFC. The difference or relative separation of the two histograms 432, 434 is the sensitivity of ECS signal to cooling.

Figure 5A:
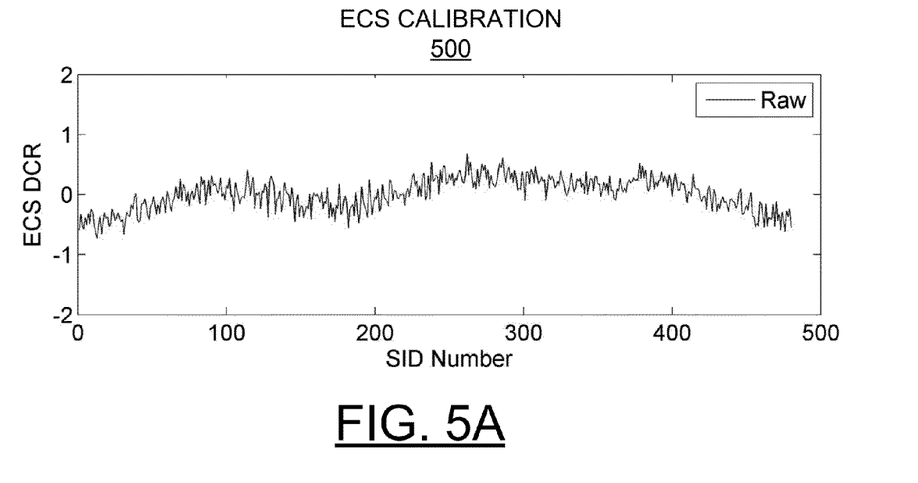
FIGS. 5A, and 5B are respective charts illustrating example embedded contact sensor (ECS) signal calibration relative to servo identification (SID) number, and sensitivity relative to servo identification (SID) number in accordance with preferred embodiments.
Figure 5B:
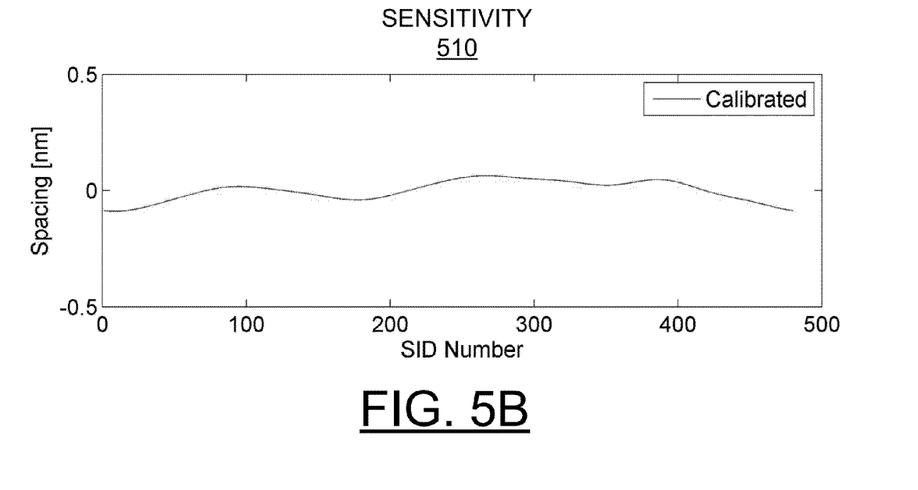

FIGS. 5A, and 5B, there are shown example embedded contact sensor (ECS) signal calibration relative to servo identification (SID) number, and sensitivity relative to servo identification (SID) number in accordance with preferred embodiments.

In FIG. 5A, the ECS signal calibration generally designated by the reference character 500 is shown with ECS DCR shown relative to a vertical axis and servo identification (SID) number shown relative to a horizontal axis.

In FIG. 5B, sensitivity generally designated by the reference character 510 is shown with spacing (nm) shown relative to a vertical axis and servo identification (SID) number shown relative to a horizontal axis.

Figure 6:
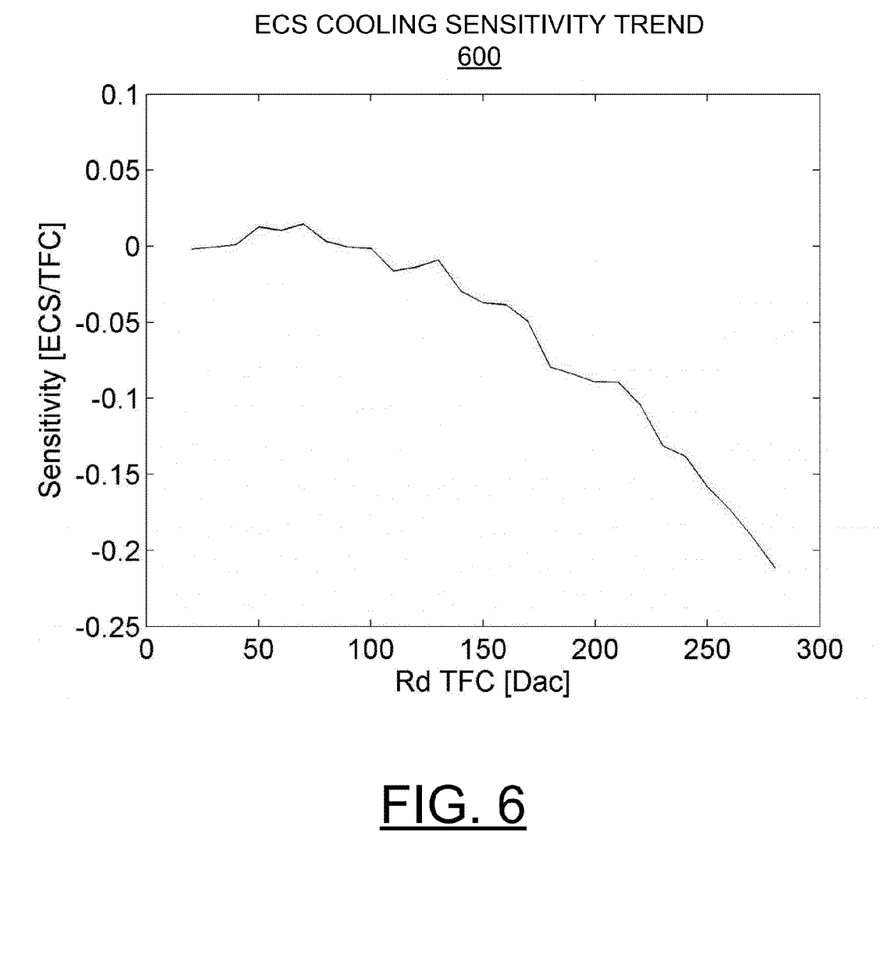
FIG. 6 is a chart illustrating an example embedded contact sensor (ECS) signal sensitivity trend with respect to thermal fly-height control (TFC) actuations in accordance with preferred embodiments.

FIG. 6 is a chart illustrating an example embedded contact sensor (ECS) cooling sensitivity trend is shown with respect to thermal fly-height control (TFC) actuations generally designated by the reference character 600. ECS cooling sensitivity trend 600 is shown with sensitivity (ECS/TFC) shown relative to a vertical axis and operating TFC (Rd TFC) DAC shown relative to a horizontal axis in accordance with preferred embodiments.

Figure 7:
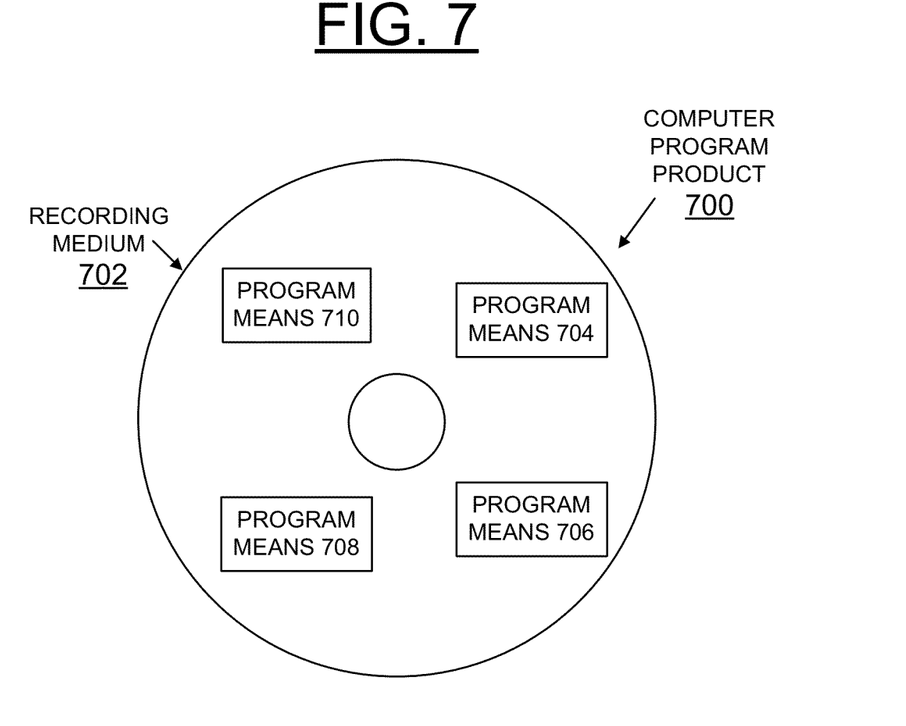
FIG. 7 is a block diagram illustrating a computer program product in accordance with preferred embodiments.

Referring now to FIG. 7, an article of manufacture or a computer program product 700 of the preferred embodiments is illustrated. The computer program product 700 includes a computer readable recording medium 702, such as, a floppy disk, a high capacity read only memory in the form of an optically read compact disk or CD-ROM, a tape, or another similar computer program product. Computer readable recording medium 702 stores program means or control code 704, 706, 708, 710 on the medium 702 for carrying out the methods for implementing calibration of cooling sensitivity of embedded contact sensor (ECS) signal is implemented using thermal fly-height control (TFC) actuations for hard disk drives in accordance with preferred embodiments in the system 100 of FIG. 1.

A sequence of program instructions or a logical assembly of one or more interrelated modules defined by the recorded program means or control code 704, 706, 708, 710, direct HDD controller 114 using calibration circuit 200 of the system 100 for implementing enhanced calibration of cooling sensitivity of embedded contact sensor (ECS) signal of preferred embodiments.

While the present invention has been described with reference to the details of the embodiments of the invention shown in the drawing, these details are not intended to limit the scope of the invention as claimed in the appended claims.

What is claimed is:

1. A method for implementing calibration of cooling sensitivity of embedded contact sensor (ECS) signal using thermal fly-height control (TFC) actuations for hard disk drives comprising:
   providing a thermal fly-height control (TFC) compensating for dynamic fly-height change around a disk revolution;
   measuring an ECS signal during operation of a hard disk drive;
   subtracting a linear TFC heat from a total measured ECS signal for providing a profile sensitive to a clearance of the head-disk interface due to cooling effect; and
   using said profile for calibrating the ECS signal measuring clearance variation of the head-disk interface and applied to the thermal fly-height control (TFC).

2. The method as recited in claim 1 wherein providing a thermal fly-height control (TFC) compensating for dynamic fly-height change around a disk revolution includes providing a heater element coupled to said thermal fly-height control (TFC).

3. The method as recited in claim 2 includes providing a slider containing said heating element, a write head, a read sensor and said embedded contact sensor (ECS).

4. The method as recited in claim 3 includes providing a Read/Write integrated circuit (IC) coupled to said slider for implementing ECS calibration circuitry.

5. The method as recited in claim 1 wherein measuring an ECS signal during operation of the hard disk drive includes providing a multiplexer coupled to said read sensor and said embedded contact sensor (ECS), and applying a read signal and the ECS signal to a multiplexer and selecting the ECS signal during write and idle operation of the hard disk drive.

6. The method as recited in claim 5 wherein subtracting a linear TFC heat from a total measured ECS signal for providing a profile sensitive to a clearance of the head-disk interface due to cooling effect includes said ECS calibration circuitry computing ECS signal slope at two different TFC points where the ECS signal is modeled as superposition of the linear TFC heat effect and a cooling effect.

7. An apparatus for implementing calibration of cooling sensitivity of embedded contact sensor (ECS) signal using thermal fly-height control (TFC) actuations for hard disk drives comprising:
a controller;
at least one disk; said disk including a disk media for storing data;
a thermal fly-height control (TFC) compensating for dynamic fly-height change around a disk revolution;
an embedded contact sensor (ECS) providing an ECS signal during operation of a hard disk drive; and
ECS calibration circuitry subtracting a linear TFC heat from the ECS signal for providing a profile sensitive to a clearance of a head-disk interface due to cooling effect; and
said controller using said profile for calibrating the ECS signal measuring clearance variation of the head-disk interface and applied to the thermal fly-height control (TFC).

8. The apparatus as recited in claim 7 includes control code stored on a non-transitory computer readable medium, and wherein said controller uses said control code for implementing calibration of cooling sensitivity of embedded contact sensor (ECS) signal using thermal fly-height control (TFC) actuations.

9. The apparatus as recited in claim 7 includes a slider containing a heating element, a write head, a read sensor and said embedded contact sensor (ECS).

10. The apparatus as recited in claim 9 includes a Read/Write integrated circuit (IC) coupled to said slider and implementing said ECS calibration circuitry.

11. The apparatus as recited in claim 10 wherein said Read/Write integrated circuit (IC) includes said thermal fly-height control (TFC) coupled to said heater element.

12. The apparatus as recited in claim 7 includes said ECS calibration circuitry computing ECS signal slope at two different TFC points where the ECS signal is modeled as superposition of the linear TFC heat effect and a cooling effect.

13. The apparatus as recited in claim 12 includes said ECS calibration circuitry computing ECS signal slope represented by ECS signal slope=a*TFC+b*TFC, where a represents heating sensitivity and b represents cooling sensitivity.

14. The apparatus as recited in claim 7 wherein said embedded contact sensor (ECS) providing an ECS signal during operation of a hard disk drive includes applying a read signal and the ECS signal to a multiplexer in said Read/Write integrated circuit (IC) of the hard disk drive and selecting the ECS signal during write and idle operation of the hard disk drive.

15. A system for implementing calibration of cooling sensitivity of embedded contact sensor (ECS) signal using thermal fly-height control (TFC) actuations for hard disk drives comprising:
a controller;
a hard disk drive including at least one recordable magnetic media;
a thermal fly-height control (TFC) compensating for dynamic flying height change around a disk revolution;
an embedded contact sensor (ECS) providing an ECS signal during operation of a hard disk drive; and
ECS calibration circuitry subtracting a linear TFC heat effect from the ECS signal for providing a profile sensitive to a clearance of a head-disk interface due to cooling effect; and
said controller using said profile for calibrating the ECS signal measuring clearance variation of the head-disk interface and applied to the thermal fly-height control (TFC).

16. The system as recited in claim 15 includes control code stored on a non-transitory computer readable medium, and wherein said controller uses said control code for implementing calibration of cooling sensitivity of embedded contact sensor (ECS) signal using thermal fly-height control (TFC) actuations.

17. The system as recited in claim 15 includes a non-transitory computer readable medium coupled to said controller storing thermal fly-height control (TFC) actuations data and said profile coupled to said controller.

18. The system as recited in claim 15 includes a Read/Write integrated circuit (IC) implementing said ECS calibration circuitry.

19. The system as recited in claim 15 includes said ECS calibration circuitry computing ECS signal slope at two different TFC points where the ECS signal is modeled as superposition of the linear TFC heat effect and a cooling effect.

20. The system as recited in claim 19 includes said ECS calibration circuitry computing ECS signal slope represented by ECS signal=a*TFC+b*TFC, where a represents heating sensitivity and b represents cooling sensitivity.

* * * * *